Figure 1:
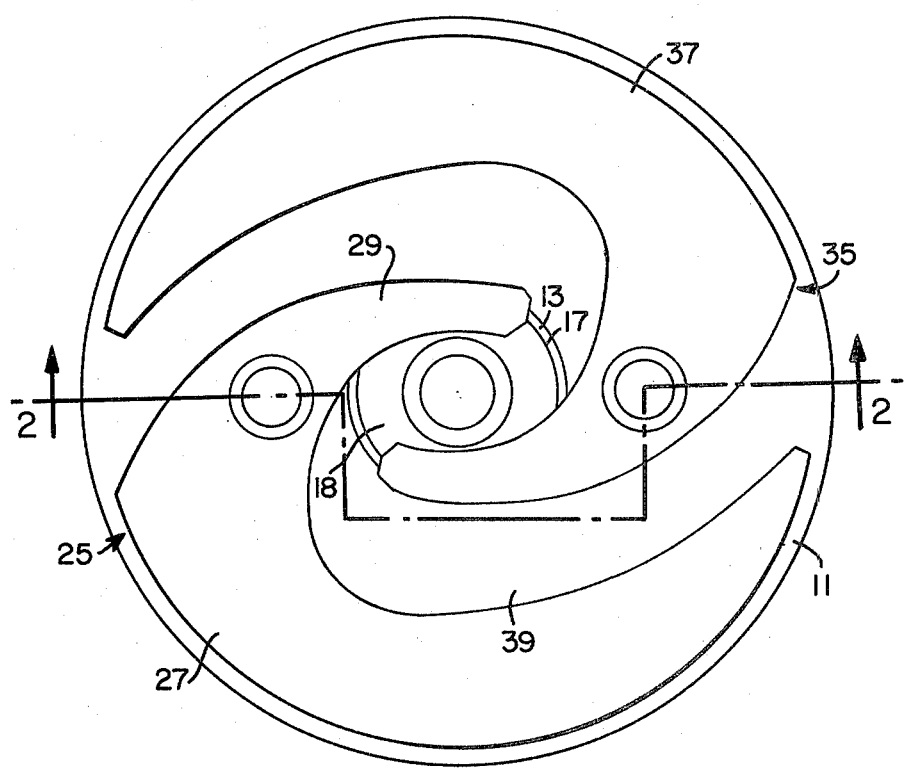

United States Patent [19]
Benjamin

[11] 3,975,029
[45] Aug. 17, 1976

[54] DRILL BIT CENTRIFUGAL VISE

[76] Inventor: George Washington Benjamin, 1220 Enslow Blvd., Huntington, W. Va. 25701

[22] Filed: Aug. 13, 1974

[21] Appl. No.: 497,037

[52] U.S. Cl. .............................. 279/1 C; 279/1 SG; 279/106
[51] Int. Cl.$^2$ ......................................... B23B 31/14
[58] Field of Search ................. 279/1 C, 1 A, 1 ME, 279/1 P, 1 SG, 35, 33, 89, 106

[56] References Cited
UNITED STATES PATENTS

| | | | |
|---|---|---|---|
| 2,450,970 | 10/1948 | Lance et al. .......................... | 279/1 C |
| 2,729,038 | 1/1956 | Hutchins .............................. | 279/33 |

Primary Examiner—J. M. Meister
Attorney, Agent, or Firm—Maurice W. Ryan

[57] ABSTRACT

A pair of eccentrically pivotally mounted vise arms on a base plate element disposed concentrically on a rotatably driven drillhead are urged by centrifugal force during rotation into lockable gripping contact with a drill steel element held in the drillhead.

10 Claims, 2 Drawing Figures

DRILL BIT CENTRIFUGAL VISE

This invention relates to a centrifugally actuated vise for holding socket mounted elements such as drill bits securely and lockably in place during use and, more particularly, to a centrifugally actuated vise which securely holds and latches mining drill steels, drill extension steels, roof bolt wrenches and the like working elements into their driving drillheads.

Current subterranean mining operations, particularly coal mining, include the practice of supporting the roofs of mined seams and rooms from which detrius has been won with plates bolted to the roof with roof bolts inserted and tightened into vertical holes drilled up into the roof. Roof bolt drilling and roof bolt installation, involving as it does the making of deep holes, requires long drill steels, drill steel extensions, roof bolt tightening wrenches, and other similar tool and work pieces, which must be rotatably driven and simultaneously forceably urged upwardly into or towards the hole being drilled or bolted. In practice, a geared drillhead arranged to move reciprocally on a power driven vertical mast element is used to provide the necessary torque and thrust for roof bolting operations in the mines. Because of the lengths of the rotating work pieces involved, some misalignment from true vertical orientation is, from time to time, bound to occur, and to accomodate this and obviate unwanted stress loading of the drill steels or the drillhead apparatus, a somewhat loose fit or at least a less than completely tight rigid grip may be provided between the drill steel and its socket in the drillhead. Since these drillhead sockets are rather shallow to begin with, the frictional grip between the drill steel and its socket may be insufficient to accomplish downward drill withdrawal from the roof bolt hole being drilled, causing the drill and socket to come apart, necessitating drill steel withdrawal by manual or other means.

The U.S. Pat. No. 2,805,073 to Fletcher, assigned to the same assignee as this application, addresses this problem and provides an inventive solution involving a quill element arranged and disposed to interlock the drillhead socket with the driven end of a drill steel element. The apparatus described in the Fletcher patent however, requires rather extensive design modifications to conventional commercially available drillhead apparatus and does not provide the same universally satisfactory solution to the problem as does the present invention.

With this then being the state of the art, the present invention was conceived and developed with the principle objective of providing a self-locking, centrifugally actuated drill steel vise practically universally adaptable to presently used mining drillhead equipment, without any appreciable additional headroom requirements.

The present invention also provides for a positive locking action between the drill steel and its driving drillhead as the drill steel is being vertically withdrawn from a drilled hole.

A further feature of the invention is that it accomodates and solves the problems attending the aforedescribed loose fit which may occur between the drill steel end and the drill steel socket in the drillhead.

Figure 2:
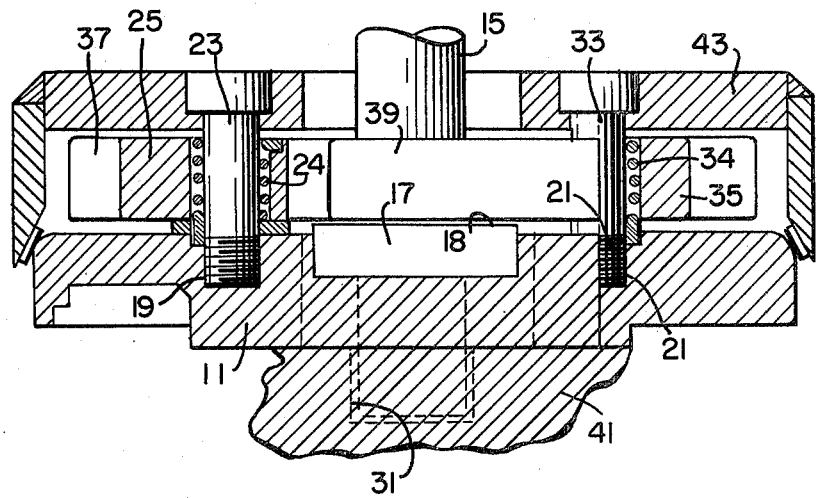

These and other features and advantages of the invention will become the more readily understood and appreciated from the ensuing detailed description and the drawings, wherein:

FIG. 1 is a top plan view of an apparatus embodiment according to the present invention, and FIG. 2 is a sectional elevational view taken through section lines 2—2 of FIG. 1 and with a dust cover 43 also shown.

In general, apparatus according to the present invention comprehends a centrifugally actuated drillhead locking device comprising, in combination, base plate means adapted to mount upon and move rotatably with a rotatably driven drillhead, and having an opening in substantial concentric registration with tool shaft socket means in said drillhead; pivot means mounted on said base plate means on an axis parallel to an eccentric from a longitudinally extending axis through the opening in the base plate means and the tool shaft socket means in said drillhead; vise lock element means pivotally mounted on said pivot means, having a major arm element extending from its pivotal mounting point in one direction and a minor arm element extending from its pivotal mounting point in another direction, pivotally moveable between a first position in which the minor arm element is out of engagement with a tool shaft disposed in said tool shaft socket means in said drillhead and a second position in which the minor arm element is in engagement with said tool shaft, said vise lock element being so arranged and disposed relative to the device that it is urged from said first position towards and into said second position by centrifugal force on rotational movement of said rotatably driven drillhead.

In a preferred embodiment of apparatus according to the invention, a second pivot means and a second vise lock element means substantially identical to the first pivot means and vise lock element means are provided, the result being the coaction of a balanced pair of vise lock elements. This paired arrangement is the embodiment illustrated in the drawings.

It is also advantageous to provided coil springs or other suitable resilient means to urge this vise lock elements towards and into their first positions out of engagement with the drill or other tool in the socket of the drillhead, as this facilitates the removal of the tool from the drillhead.

This invention provides an even greater advantage in positive latching action in embodiments wherein the minor arm elements of the vise lock element means engage against surfaces normal to or substantially normal to the longitudinal axes of tools held in the drillhead, such as for example in the overlapping of a facia surface of a flange on a drill bit or the like tool piece.

With reference to the drawings, an embodiment of apparatus according to the invention comprises a base plate 11 which is shown circular in planform or top view in FIG. 1. Base plate 11 is provided with a center hole 13 of clearance dimension to accomodate the size tool shaft 15 being used according to its largest circumference, such as a flange 17, and with drilled and tapped pivot holes 19, 21 which accomodate pivots 23, 33. Pivots 23, 33 are arranged on respective axes parallel to and eccentric from the longitudinally extending axial centerline of the device passing through the base plate centerhole 13 which is arranged concentrically in registration with a tool shaft socket 31 in a drillhead 41. The pivots 23, 33, in the embodiment illustrated in the drawings, are cap screws which serve the added purpose of holding a dust cover in place on the completely assembled apparatus.

Centrifugal vise jaws or lock elements 25, 35 are shown pivotally mounted respectively on the pivots 23, 33. Each of the vise lock elements 25, 35 has a major arm element 27, 37 and a minor arm element 29, 39, the major arm elements being of greater mass so that in the illustration shown in FIG. 1 they, the major arm elements, will tend to move outwardly away from the axial centerline of the apparatus upon rotation (clockwise in the illustration shown) of the base plate with the drillhead. As the major arm elements 27, 37 move outwardly by virtue of centrifugal force occasioned by the drillhead rotation, the minor arm elements 29, 39 swing or pivot on pivots 23, 33 inwardly and engage the shaft 15 of whatever tool is being used. In the illustrated embodiment, at least a portion of each minor arm element 29, 39 also overlaps the flange 17 of tool shaft 15 and will effect a positive locking restraint against axial withdrawal of the tool from the tool shaft socket 31 by bearing against the flange facia surface 18 in reaction to any encountered pull out force. This feature of the invention insures that drill bits, drill steel extensions and the like work pieces or tools will not be left up in the roof bolt holes when the drillhead is retracted, or more importantly, be slung or thrown out of the rotating drillhead upon retraction from the work hole.

Other modes of good gripping contact are also selectable either as alternatives to or in combination with the overlapping of flange mode illustrated and described above. In cases where the tool shaft is hollow, such as in instances where it is used as a dust tube, the minor arms of the vise lock elements may latch into circumferentially disposed slots or latch ports cut into the tool shaft and thus effect positive locking restraint against axial withdrawal of the tool from the drillhead. The gripping action between the tool shaft and the minor arms of the vise lock elements may also be enhanced by knurling or otherwise roughening the contact making surfaces involved.

In the illustrated embodiment there are also shown coil springs 24, 34 which are disposed concentrically around the pivots 23, 33 and connect between the respective vise lock elements 25, 35 and the base plate 11, biased in a manner to urge the vise lock elements into their respective first positions. This arrangement facilitates tool installation and removal, particularly with flanged tools, by keeping the minor arms 29, 39 back out of the way of the base plate 11 centerhole 13 and the tool shaft socket 31 while the drillhead is at rest. The resilient force of the springs 24, 34 is selected low enough to be readily overcome by centrifugal force upon rotation of the drillhead.

It is considered that, in the light of the foregoing disclosure, numerous alternative embodiments of the invention, but well within its spirit, will occur to persons conversant with the art. Therefore it is intended that the description be taken as illustrative only, and not construed in any limiting sense.

I claim:

1. A centrifugally actuated drillhead locking device comprising, in combination,
    base plate means adapted to mount upon and move rotatably with a rotatably driven drillhead, and having an opening in substantial concentric registration with tool shaft socket means in said drillhead;
    pivot means mounted on said base plate means on an axis parallel to and eccentric from a longitudinally extending axis through the opening in the base plate means and the tool shaft socket means in said drillhead;
    vise lock element means pivotally mounted on said pivot means, having a major arm element extending from its pivotal mounting point in one direction and a minor arm element extending from its pivotal mounting point in another direction, pivotally moveable between a first position in which the minor arm element is in engagement with said tool shaft, said vise lock element means being so arranged and disposed relative to the device that it is urged from said first position towards and into said second position as said major arm element is moved outwardly by centrifugal force developed upon rotational movement of said rotatably driven drillhead.

2. Apparatus according to claim 1 in combination with second pivot means and second vise lock element means substantially identical to and arranged and disposed to coact with said pivot means and said vise lock element means as half of a pair of vise lock elements.

3. Apparatus according to claim 1 including resilient means connected to said vise lock element means arranged to urge said vise lock element means towards and into said first position.

4. Apparatus according to claim 2 including resilient means connected to each said vise lock element means arranged to urge each said vise lock element means towards and into its respective said first position.

5. Apparatus according to claim 1 in which at least part of the minor arm element of the vise lock element means is arranged to engage a latching surface on a tool shaft disposed in the tool shaft socket means in the drillhead when said vise lock element is in said second position.

6. Apparatus according to claim 2 in which at least part of each respective minor arm element of the respective vise lock element means is arranged to engage a latching surface on a tool shaft disposed in the tool shaft socket means in the drillhead when each said vise lock element means is in said second position.

7. Apparatus according to claim 1 in which at least part of the minor arm element of the vise lock element means is arranged to engage a tool shaft disposed in the tool shaft socket means in the drillhead on a latching surface substantially normal to the longitudinal axis of the tool shaft when said vise lock element means is in said second position.

8. Apparatus according to claim 2 in which at least part of each respective minor arm element of the respective vise lock element means is arranged to engage a tool shaft disposed in the tool shaft socket means in the drillhead on a latching surface substantially normal to the longitudinal axis of the tool shaft when each said vise lock element means in in said second position.

9. Apparatus according to claim 1 in which at least part of the minor arm element of the vise lock element means is arranged and disposed to effect overlapping engagement with a facia surface of a flange on a tool shaft disposed in the tool shaft socket means in the drillhead when said vise lock element means is in said second position.

10. Apparatus according to claim 2 in which at least part of each respective minor arm element of the respective vise lock element means is arranged and disposed to effect overlapping engagement with a facia surface of a flange on a tool shaft disposed in the tool shaft socket means in the drillhead when each said vise lock element means in in said second position.

* * * * *